United States Patent
Lang et al.

(10) Patent No.: US 8,471,426 B2
(45) Date of Patent: Jun. 25, 2013

(54) ELECTRIC MACHINE WITH POWER TAPS

(75) Inventors: Nicholas G. Lang, Cincinnati, OH (US); William R. Finley, Cincinnati, OH (US)

(73) Assignee: Siemens Industry, Inc., Alpharetta, GA (US)

(*) Notice: Subject to any disclaimer, the term of this patent is extended or adjusted under 35 U.S.C. 154(b) by 267 days.

(21) Appl. No.: 13/099,800

(22) Filed: May 3, 2011

(65) Prior Publication Data

US 2012/0280581 A1 Nov. 8, 2012

(51) Int. Cl.
*H02K 1/00* (2006.01)
(52) U.S. Cl.
USPC .......................................... 310/178; 310/180
(58) Field of Classification Search
USPC .................................. 310/179–180, 184, 198
See application file for complete search history.

(56) References Cited

U.S. PATENT DOCUMENTS

| | | | | |
|---|---|---|---|---|
| 3,577,929 A * | 5/1971 | Onoda et al. | .................. | 104/290 |
| 4,233,555 A * | 11/1980 | Roche | .............. | 322/25 |
| 6,995,546 B2 * | 2/2006 | Fujikawa | ........................ | 322/93 |
| 2005/0242676 A1 * | 11/2005 | Fujikawa | ........................ | 310/179 |
| 2010/0277029 A1 * | 11/2010 | Fujita et al. | .................... | 310/208 |
| 2011/0074239 A1 * | 3/2011 | Nishiyama et al. | ............ | 310/195 |

* cited by examiner

*Primary Examiner* — Thanh Lam

(57) ABSTRACT

Machines and motors with multiple three-phase AC power connections. A motor includes first, second, and third windings arranged to drive a rotator shaft. A first end of each winding is connected to a respective power input of a three-phase alternating current (AC) power source and a second end of each winding is connected to a neutral. The motor includes at least one intermediate tap connected to each of the first, second, and third windings at substantially equal respective distances between the neutral and the respective power inputs. The intermediate taps together provide a three-phase AC power output at a voltage that is less than the voltage of the three-phase AC power source.

12 Claims, 2 Drawing Sheets

ELECTRIC MACHINE WITH POWER TAPS

TECHNICAL FIELD

The present invention relates to electric machines and related assemblies.

BACKGROUND OF THE DISCLOSURE

A typical industrial electric motor or other machine includes a three-phase motor that generated significant heat. Improved machines and related assemblies are desirable.

SUMMARY OF THE DISCLOSURE

Various disclosed embodiments include machines and motors with multiple three-phase AC power connections. A motor includes first, second, and third windings arranged to drive a rotator shaft. A first end of each winding is connected to a respective power input of a three-phase alternating current (AC) power source and a second end of each winding is connected to a neutral. The motor includes at least one intermediate tap connected to each of the first, second, and third windings at substantially equal respective distances between the neutral and the respective power inputs. The intermediate taps together provide a three-phase AC power output at a voltage that is less than the voltage of the three-phase AC power source.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
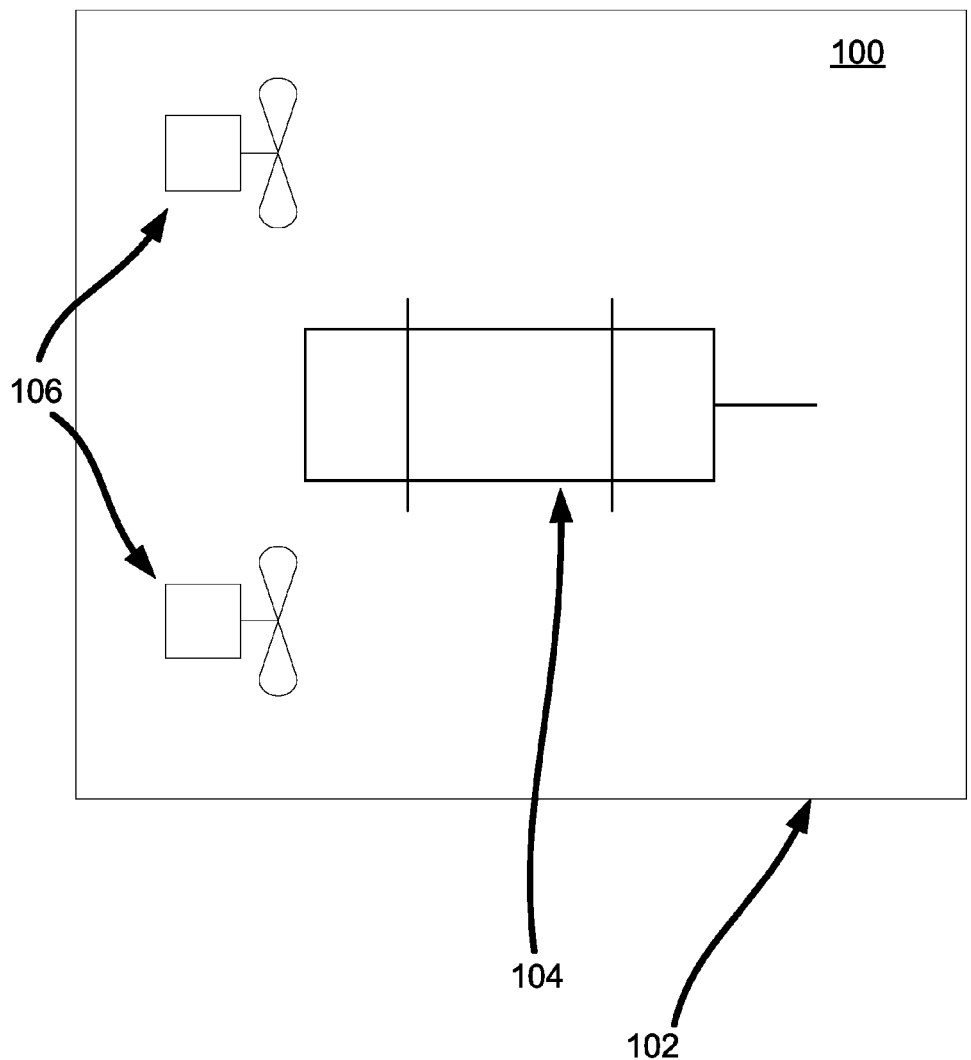
FIG. 1 shows a block diagram of an exemplary machine motor housing with auxiliary fans.
Figure 2:
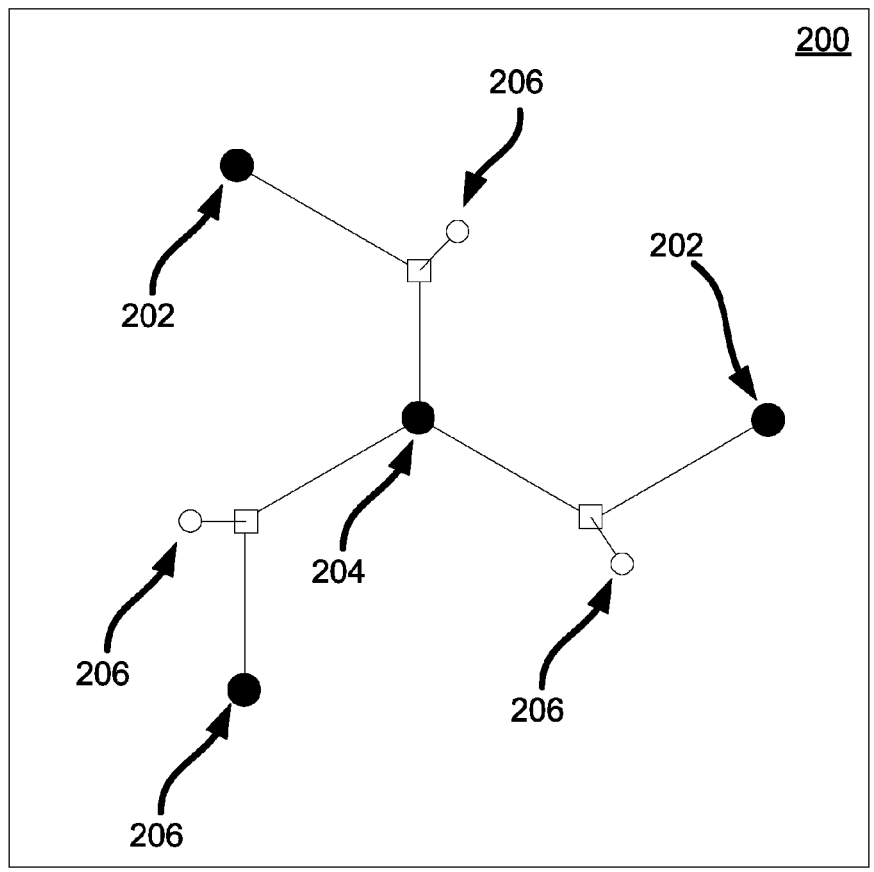
FIG. 2 shows a simplified schematic diagram of windings of a motor in accordance with disclosed embodiments.

FIGS. 1 and 2 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In electric machines, often configurations require that some volume of air is circulated through the machine's internal components in order to provide necessary cooling. Typically the size of the fan and the size of the machine's internal components are restricted to dimensions inside the yoke or frame.

By mounting auxiliary fans or blowers to the machine enclosure, it is possible to drastically increase internal airflow, or to increase the similar external airflow for some totally-enclosed machines.

FIG. 1 shows a block diagram of an exemplary machine motor housing with auxiliary fans. In this example, machine 100 has a housing 102. In the housing 102 is the machine motor 104, and auxiliary fans 106. Of course, there will typically be other components and wiring present, and the auxiliary fans 106 could instead be other auxiliary equipment. In particular, the machine 100 will include components connected to be driven by a rotator shaft of the motor.

In using auxiliary fans, blowers, or other equipment, the motors driving that equipment typically operate at a much lower voltage than the machine that is being cooled. For that reason, a typical machine will require an additional transformer to be installed as well as a substantial amount of additional power cabling. The additional wiring, transformers, and other components needed to supply the lower voltage to the auxiliary equipment can be difficult to properly place in the machine housing, may itself restrict airflow, and may increase system cost.

These machines can include consumer, commercial, or industrial machines of various types, including machine tools, heating and cooling machines, industrial robots, conveyors, and any other machines. These machines typically include a three-phase motor with a winding for each phase of the source electric power.

According to various disclosed embodiments, one or more taps are installed at intermediate points of each winding, and these taps act as power supplies for lower-voltage auxiliary equipment. By bringing out a tap from the main motor windings, the machine system can operate with one voltage applied and can also supply the lower voltage required by the smaller auxiliary motors or devices.

The power taps off of the main motor windings supply three-phase alternating current power at a voltage proportional to the voltage applied to the motor and out of which location in the winding the tap is brought.

FIG. 2 shows a simplified schematic diagram of windings of a motor 200 in accordance with disclosed embodiments. The windings are represented by the three legs extending between the three-phase power input connections 202 and the neutral connection 204. Of course, while the windings are represented here as "broken" straight legs, the actual windings are wound as known to those of skill in the art. Together, the windings are arranged to drive a rotator shaft of the motor in a manner known to those of skill in the art.

Each of the windings also has at least one intermediate tap 206. Intermediate taps 206 act as power connections for auxiliary devices, and can be placed anywhere on each winding. The alternating voltage supplied at each intermediate tap is proportional to voltage at the input connection and the point at which the intermediate tap is connected to each winding. Typically, each winding acts as a voltage divider so that the output voltage at an intermediate tap is approximately equal to the voltage at the input connection multiplied by a ratio of the impedance of the winding portion between the neutral connection and the intermediate tap as compared to the impedance of the entire winding.

When the winding material has a consistent voltage drop over its length, the voltage at the intermediate tap will be approximately equal to the voltage at the input connection multiplied by a ratio of the length of the winding portion between the neutral connection and the intermediate tap as compared to the length of the entire winding.

Preferably, each intermediate tap 206 is placed at the same relative distance on the respective winding as measured from the neutral connection. This will make the output voltage at each intermediate tap to be approximately the same, with the expected phase difference, to provide a balanced, reduced voltage, three-phase output at the intermediate taps 206.

Because it can be difficult to connect intermediate taps to the windings at like locations when the winding material has already been wound, it is preferable that the intermediate taps are connected to each winding during manufacture, before the windings are actually wound.

In an exemplary embodiment, a machine motor 200, such as that of machine motor 104, can be driven by the windings shown in FIG. 2, with a three-phase voltage at the power input connections 202 of 4,160V. The voltage at the power input connections can be any appropriate voltage to drive the machine motor 104, and can in particular be in the range of 380V-13.8 kV for various industrial motors.

The power output at the intermediate taps 206 can then be a lesser three-phase voltage connected to drive the auxiliary fans 106. For example, if the three-phase voltage at the power input connections 202 is 4,160V, then the output of the three-phase voltage at intermediate taps 206 may be 460V, in this exemplary embodiment.

In other embodiments, different voltages can be used, each winding can have multiple intermediate taps at different locations for different proportional voltage outputs, and one or more auxiliary devices can be attached to each intermediate tap.

Various elements of the embodiments described above can be omitted from specific embodiments or combined with other embodiments.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A motor, comprising:
    first, second, and third windings arranged to drive a rotator shaft, a first end of each winding connected to a respective power input of a three-phase alternating current (AC) power source and a second end of each winding connected to a neutral; and
    at least one intermediate tap connected to each of the first, second, and third windings at substantially equal respective distances between the neutral and the respective power inputs, wherein the intermediate taps together provide a three-phase AC power output at a voltage that is less than the voltage of the three-phase AC power source.

2. The motor of claim 1, wherein each winding is connected to multiple intermediate taps, each winding having one of the intermediate taps at substantially equal respective distances between the neutral and the respective power inputs.

3. The motor of claim 1, wherein the a three-phase AC power output voltage is approximately equal to the voltage of the three-phase AC power source multiplied by a ratio of an impedance of the portion of the respective winding between the neutral connection and the intermediate tap as compared to an impedance of the entire respective winding.

4. The motor of claim 1, wherein the a three-phase AC power output voltage is approximately equal to the voltage of the three-phase AC power source multiplied by a ratio of a length of the portion of the respective winding between the neutral connection and the intermediate tap as compared to a length of the entire respective winding.

5. A machine, comprising:
    a housing;
    a motor disposed in the housing, the motor having
        first, second, and third windings arranged to drive a rotator shaft, a first end of each winding connected to a respective power input of a three-phase alternating current (AC) power source and a second end of each winding connected to a neutral;
        at least one intermediate tap connected to each of the first, second, and third windings at substantially equal respective distances between the neutral and the respective power inputs, wherein the intermediate taps together provide a three-phase AC power output at a voltage that is less than the voltage of the three-phase AC power source; and
    at least one auxiliary equipment disposed in the housing and connected to be powered by the three-phase AC power output.

6. The machine of claim 5, wherein each winding is connected to multiple intermediate taps, each winding having one of the intermediate taps at substantially equal respective distances between the neutral and the respective power inputs.

7. The machine of claim 5, wherein the a three-phase AC power output voltage is approximately equal to the voltage of the three-phase AC power source multiplied by a ratio of an impedance of the portion of the respective winding between the neutral connection and the intermediate tap as compared to an impedance of the entire respective winding.

8. The machine of claim 5, wherein the a three-phase AC power output voltage is approximately equal to the voltage of the three-phase AC power source multiplied by a ratio of a length of the portion of the respective winding between the neutral connection and the intermediate tap as compared to a length of the entire respective winding.

9. The machine of claim 5, wherein the auxiliary equipment includes a fan that circulates air within the housing.

10. The machine of claim 5, further comprising components connected to be driven by the rotator shaft.

11. The machine of claim 5, wherein the three-phase AC power source is 4,160V.

12. The machine of claim 5, wherein the three-phase AC power output voltage is 460V.

* * * * *